United States Patent
Sasaki

(10) Patent No.: US 8,022,303 B2
(45) Date of Patent: Sep. 20, 2011

(54) FEED-THROUGH AND BUSHING

(75) Inventor: Masayuki Sasaki, Tokyo (JP)

(73) Assignee: Furukawa Electric Industrial Cable Co., Ltd., Tokyo (JP)

( * ) Notice: Subject to any disclaimer, the term of this patent is extended or adjusted under 35 U.S.C. 154(b) by 485 days.

(21) Appl. No.: 12/303,839

(22) PCT Filed: Jun. 7, 2006

(86) PCT No.: PCT/JP2006/311437
§ 371 (c)(1),
(2), (4) Date: Dec. 8, 2008

(87) PCT Pub. No.: WO2007/141853
PCT Pub. Date: Dec. 13, 2007

(65) Prior Publication Data
US 2010/0163280 A1 Jul. 1, 2010

(51) Int. Cl.
*H01B 17/26* (2006.01)
(52) U.S. Cl. .............. 174/152 R; 174/151; 174/668; 174/152 G; 174/658; 248/56; 439/98
(58) Field of Classification Search .......... 174/151, 174/668, 152 G, 656, 658, 662, 667, 659, 174/154, 152 R; 248/56; 439/98
See application file for complete search history.

(56) References Cited

U.S. PATENT DOCUMENTS

| 5,227,587 | A | * | 7/1993 | Paterek | 174/152 GM |
| 5,408,740 | A | * | 4/1995 | Dee | 29/887 |
| 6,156,979 | A | * | 12/2000 | Pioch | 174/152 G |
| 7,615,715 | B2 | * | 11/2009 | Hofmann et al. | 174/668 |
| 7,763,808 | B2 | * | 7/2010 | Tolbert, Jr. | 174/152 R |

FOREIGN PATENT DOCUMENTS

| JP | 8 338596 | 12/1996 |
| JP | 10 42439 | 2/1998 |

* cited by examiner

*Primary Examiner* — Dhirubhai R Patel
(74) *Attorney, Agent, or Firm* — Oblon, Spivak, McClelland, Maier & Neustadt, L.L.P.

(57) ABSTRACT

A feed-through for feeding electric power to a submerged pump installed in a tank for cryogenic liquefied gases such as (LNG) liquefied natural gas and (LPG) liquefied propane gas. In the feed-through, a bushing made of an insulating material is inserted in the bushing insertion hole of a flange, and a conductor is inserted in the hollow part of the bushing. A gap between the flange and each end of the bushing insertion hole and a gap between each end of the bushing and the conductor are sealed airtight by seal members. A through-hole is formed in the wall of the bushing, and a space part communicating with the through-hole is formed in the flange. The pressure in the space part of the flange is detected by a pressure detector.

4 Claims, 4 Drawing Sheets

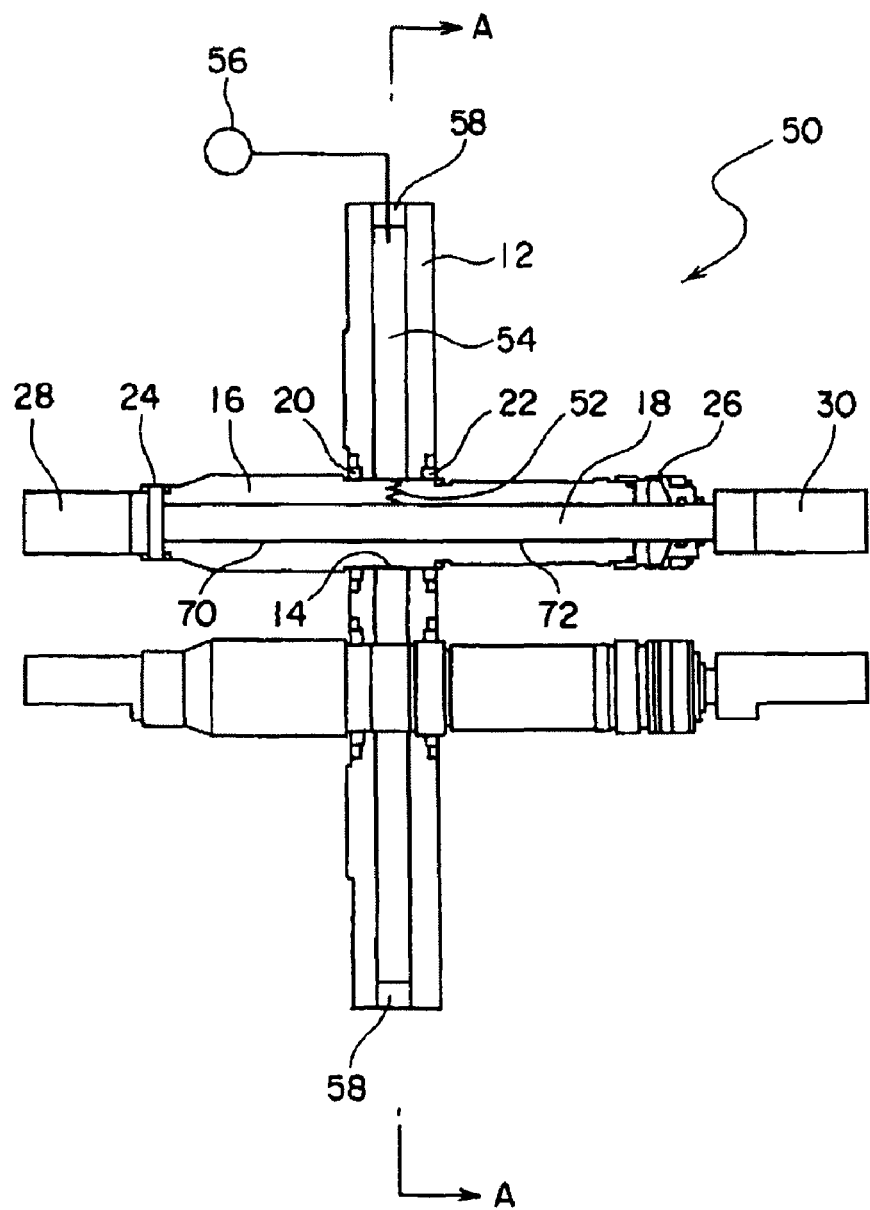
[Fig.1]

[Fig.2]
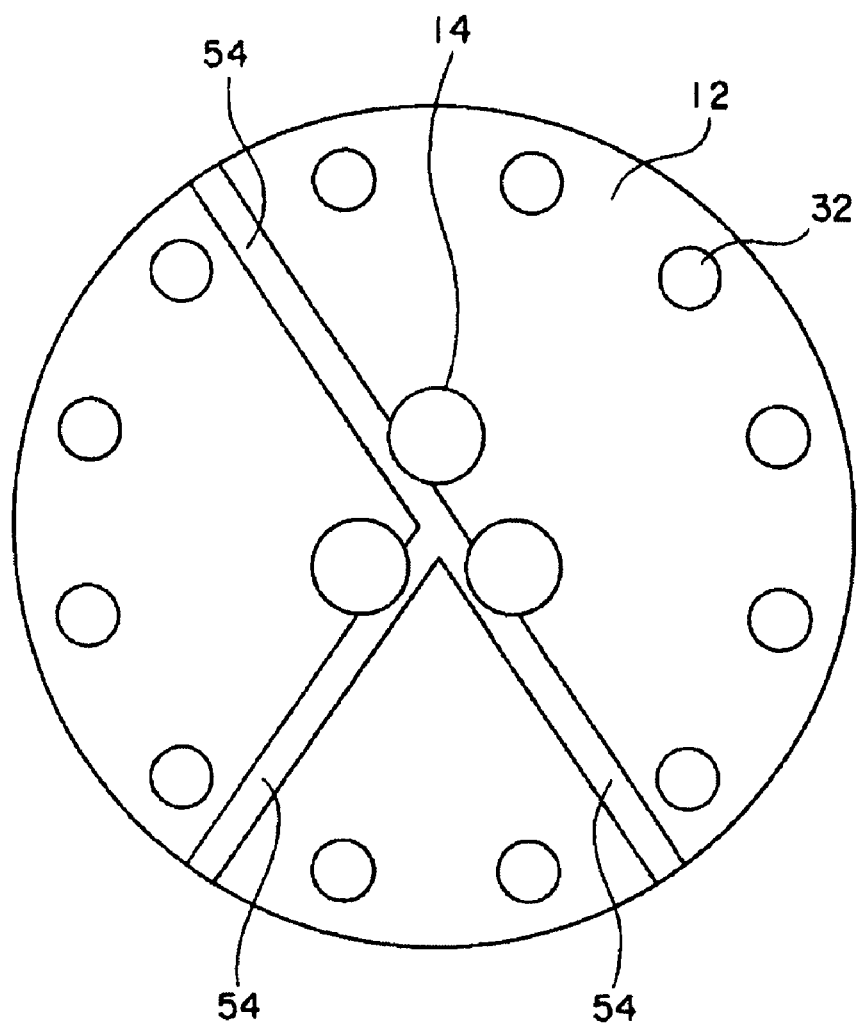

[Fig.3]
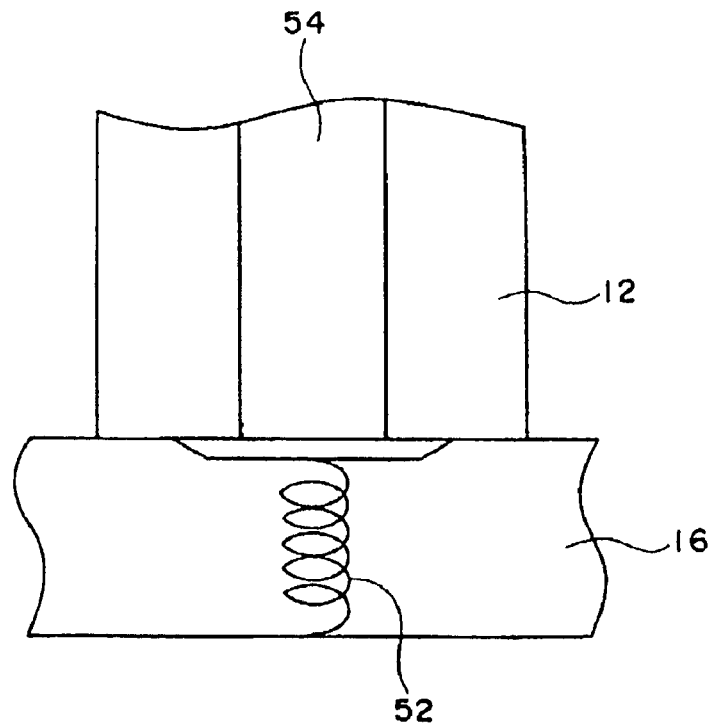
[Fig.4]
Prior Art
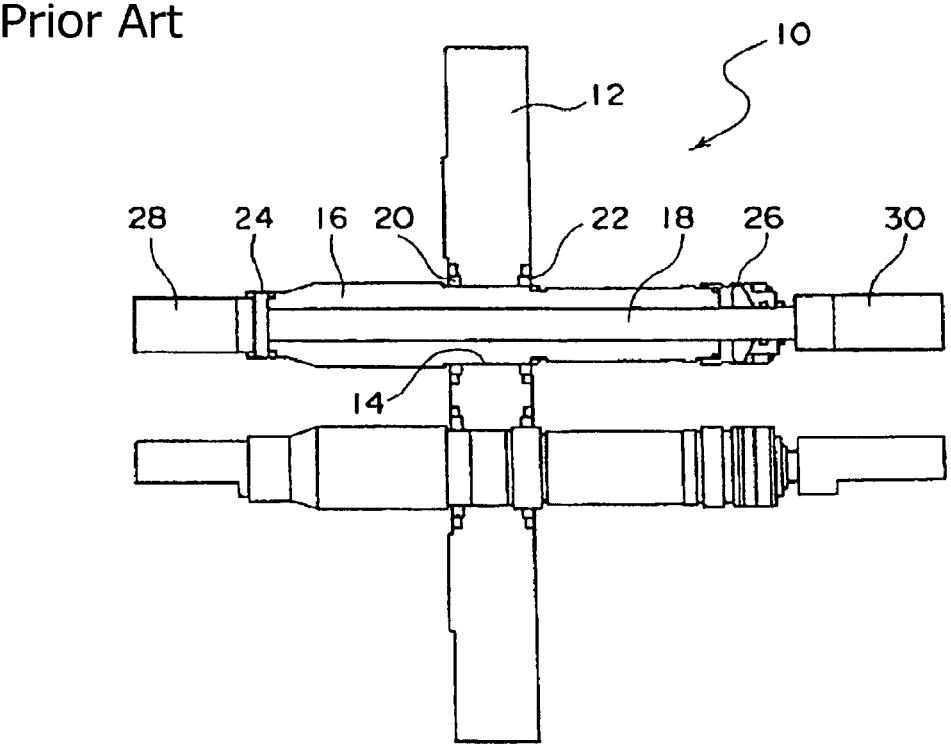

[Fig.5]
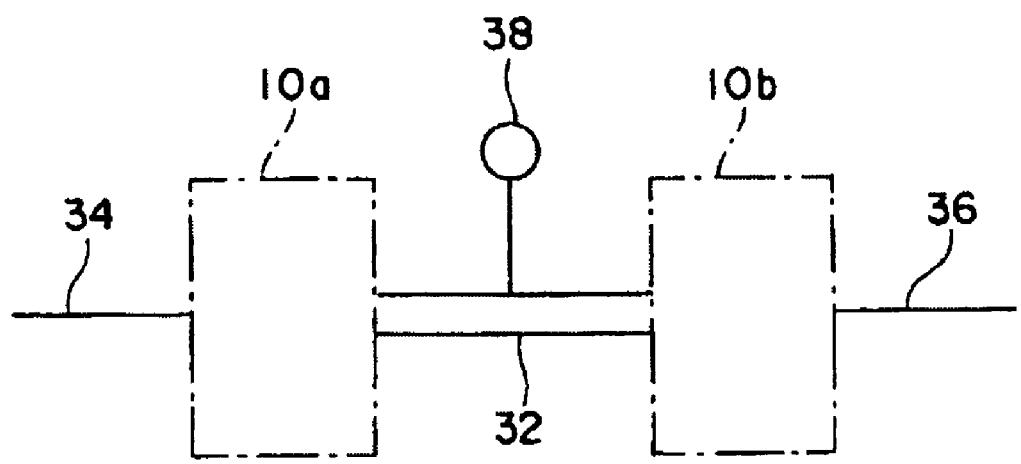

FEED-THROUGH AND BUSHING

TECHNICAL FIELD

The present invention relates to a feed-through for feeding electric power to a submerged pump installed in a tank for cryogenic liquefied gas, such as liquefied natural gas (LNG) and liquefied petroleum gas (LPG).

BACKGROUND ART

Conventionally, a feed-through configured as shown in FIG. 4 is used as a feed-through for feeding electric power to a submerged pump installed in a tank for cryogenic liquefied gas, such as LNG and LPG (refer to, for example, Patent Literatures 1 to 4). In a feed-through 10 in FIG. 4, a ceramic bushing 16 (only two bushings are shown in FIG. 4) is inserted into each of three bushing insertion holes 14 on a stainless steel, disc-shaped flange (partitioning flange) 12. A conductor 18 is inserted into a hollow portion of the bushing 16. Gaps between the flange 12 and each end of the bushing insertion holes 14 are hermetically sealed by sealing sections that are sealing members 24 and 26, such as bellows. Gaps between both ends of the bushings 16 and the conductor 18 are sealed by sealing sections that are sealing members 24 and 26, such as bellows.

The feed-through 10 of the example is fixed onto an LNG tank by, for example, the flange 12 being layered onto an upper end flange section of a pump housing pipe projecting outwards from an upper wall of the LNG tank, and hermetically fixed. In this state, in the feed-through 10, a low temperature side terminal 28 is inserted into the pump housing pipe, and a low temperature cable is connected to the low temperature side terminal 28. An ordinary cable is connected to an external air side terminal 30 that is outside. As a result, electric power can be fed to the submerged pump housed within the pump housing pipe of the LNG tank, via the cable, the feed-through 10, and the low temperature cable.

Patent Literature 1: Japanese Patent Laid-open Publication No. Heisei 8-338596
Patent Literature 2: Japanese Patent Laid-open Publication No. Heisei 10-116529
Patent Literature 3: Japanese Patent Laid-open Publication No. Heisei 10-116530
Patent Literature 4: Japanese Patent Laid-open Publication No. 2002-340295

DISCLOSURE OF INVENTION

Problem to be Solved by the Invention

As a method of fixing a feed-though to a tank for cryogenic liquefied gas, described above, and checking for a gas leak from a low temperature side to an external air side or an air leak from the external air side to the low temperature side in this state, conventionally, as shown in FIG. 5, two feed-throughs 10a and 10b are connected to a pipe 32. One feed-through 10a is fixed to the tank. A low temperature cable 34 is connected to the feed-through 10a. An ordinary cable 36 is connected to the other feed-through 10b. A pressure detector 38 detects pressure fluctuations within the pipe 32. In other words, when the gas leak from the low temperature side to the external air side or the air leak from the external air side to the low temperature side occurs, gas or air flows within the pipe 32. Therefore, the gas or air leak can be detected by pressure fluctuation being detected within the pipe 32. The gas leak can also be detected by a gas sensor detecting gas within the pipe 32.

However, in the method described above in which the gas and air leaks are checked using two feed-throughs, device configuration becomes complicated. Moreover, cost increases because two feed-throughs are required.

The present invention has been achieved in light of the above-described issues. An object of the present invention is to provide a feed-through that has a simple configuration and can check for gas and air leaks at a low cost, and a bushing used in the feed-through.

Means for Solving Problem

To achieve the above-described object, the present invention provides a feed-through in which a bushing made from an insulating material is inserted into a bushing insertion hole in a flange. A conductor is inserted into a hollow portion of the bushing. Gaps between the flange and both ends of the bushing through-hole and gaps between both ends of the bushing and the conductor each hermetically sealed. In the feed-through, a through-hole passing through a wall section is formed in the bushing and a space part communicating with the through-hole is formed in the flange.

The present invention also provides a bushing that is made from an insulating material and is inserted into a bushing insertion hole in a flange of a feed-through. A through-hole passing through a wall section is formed in the bushing.

In the feed-through, the through-hole passing through a wall section is formed in the bushing. A space part communicating with the through-hole is formed in the flange. Therefore, when gas leaks into the bushing from a sealing section of a low temperature side end section of the bushing and the conductor, or air leaks into the bushing from a sealing section of an atmosphere side end section of the bushing and the conductor, the gas or air passes through the through-hole in the bushing and flows into the space part in the flange. Pressure fluctuates within the space part in the flange. When gas leaks into the space part in the flange from a sealing section of the flange and the low temperature side end section of the bushing insertion hole, or air leaks into the space part in the flange from a sealing section of the flange and an atmosphere side end section of the bushing insertion hole, the pressure fluctuates within the space part in the flange. Therefore, in the feed-through of the present invention, the gas or air leak can be detected by the pressure fluctuation being detected within the space part in the flange. In addition, in the feed-through of the present invention, the gas leak can be detected by a gas sensor detecting gas within the space part in the flange.

In the present invention, a shape and inner diameter of the through-hole in the bushing is not particularly limited. However, the through-hole is preferably a shape that can increase insulation separating distance. More preferably, the through-hole has a spiral shape.

A shape and size of the space part in the flange is not limited. However, in terms of mounting the pressure detector and the like, the space part is preferably a through-space part provided between an inner circumferential surface of the bushing insertion hole and an outer circumferential surface of the flange.

Effect of the Invention

The feed-through of the present invention has a simple configuration and can check for gas and air leaks at a low cost.

BRIEF DESCRIPTION OF DRAWINGS

FIG. 1 is a partial cross-sectional front view of a feed-through according to an embodiment of the present invention.

FIG. 2 is a cross-sectional view of a flange in the feed-through, taken along line A-A in FIG. 1.

FIG. 3 is a partially enlarged schematic view of the feed-through.

FIG. 4 is a partial cross-sectional front view of an example of a conventional feed-through.

FIG. 5 is a conceptual diagram of a gas and air leak checking method when the conventional feed-through is used.

EXPLANATIONS OF LETTERS OR NUMERALS

Best Mode(s) for Carrying Out the Invention

An embodiment of the present invention will be described below with reference to the drawings. However, the present invention is not limited to the examples described hereafter. FIG. 1 is a partial cross-sectional front view of a feed-through according to an embodiment of the present invention. FIG. 2 is a cross-sectional view of a flange in the feed-through, taken along line A-A in FIG. 1. FIG. 3 is a partially enlarged schematic view of the feed-through. In FIG. 1 to FIG. 3, sections that are the same as those in FIG. 4 are given the same reference numbers. Explanations thereof are omitted. In FIG. 3, sealing components 20 and 22 are not shown.

A feed-through 50 according to a present example is a feed-through in FIG. 1, in which a through-hole 52 that passed through a wall section is formed on a bushing 16. A space part 54 communicating with the through-hole 52 is formed in a flange 12. A pressure detector 56 that detects pressure within the space part 54 is provided. In FIG. 2, reference number 32 indicates a bolt hole.

The through-hole 52 is a spiral-shaped through-hole. One through-hole 52 is formed on each bushing 16. However, a plurality of through-holes can be formed on a single bushing. A bushing of the present example, for example, can be manufactured by a resin molding being embedded in a bushing forming material, such as a ceramic material. The resin molding is formed from polycarbonate and the like, and has a shape corresponding to a shape of the through-hole. The bushing forming material is burned, and the resin molding is gasified.

The space part 54 is a columnar through-space part formed between an inner circumferential surface of a bushing insertion hole 14 and an outer circumferential surface of the flange 12. Three space parts 54 are formed radiating within the flange 12 in correspondence with the three brushings 16. The three space parts 54 communicate with each other on inner end sides. Outer end sides are hermetically blocked by an appropriate blocking member 58, such as an attaching board of the pressure detector 56.

A usage method of the feed-through 50 of the present example is similar to that of the feed-through in FIG. 1. Therefore, explanation thereof is omitted. When the feed-through 50 of the present invention is fixed to a tank for cryogenic liquefied gas, and a gas leak from a low temperature side to an external air side or an air leak from the external air side to the low temperature side are checked in this state, as described above, the pressure detector 56 detects pressure fluctuation within the space part 54 in the flange 12. In other words, in the feed-through 50 of the present example, when gas 70 leaks into the bushing 16 from a sealing section 24 of a low temperature side end section of the bushing 16 and a conductor 18, or air 72 leaks into the bushing 16 from a sealing section 26 of an atmosphere side end section of the bushing 16 and the conductor 18, the gas 70 or the air 72 passes through the through-hole 52 and flows into the space part 54. Pressure fluctuates within the space part 54. Moreover, when gas leaks into the space part 54 from a sealing section 20 of the flange 12 and a low temperature side end section of the bushing insertion hole 14, or air leaks into the space part 54 from a sealing section 22 of the flange 12 and an atmosphere side end section of the bushing insertion hole 14, the pressure fluctuates within the space part 54. Therefore, the gas or air leak can be detected by the pressure detector 56 detecting pressure fluctuation within the space part 54.

The feed-through of the present invention is not limited to the example described above. Modifications can be made accordingly. For example, although the through-hole in the bushing in the above-described example is spiral-shaped, another shape can be used that can increase insulation separation distance. Three space parts in the flange communicate with each other, and a single pressure detector is provided in the above-described example. However, three pressure detectors for detecting pressure within each space part can be provided without the three space parts communicating with each other. Moreover, the space parts in the flange can have another shape. In the above-described example, the gas or air leak is detected by the pressure detector detecting the pressure fluctuation within the space part. However, a gas sensor can be disposed within the space part. The gas sensor can detect gas within the space part, thereby detecting a gas leak.

The invention claimed is:

1. A feed-through in which a bushing made from an insulating material is inserted into a bushing insertion hole in a flange, a conductor is inserted into a hollow portion of the bushing, and gaps between the flange and both ends of the bushing insertion hole and gaps between both ends of the bushing and the conductor are each hermetically sealed, wherein:

a through-hole passing through a wall section is formed on the bushing, and a space part communicating with the through-hole is formed on the flange, wherein the through-hole in the bushing is a spiral-shaped through-hole.

2. The feed-through according to claim 1, wherein the space part in the flange is a through-space part formed between an inner circumferential side of the bushing insertion hole and an outer circumferential surface of the flange.

3. The feed-through according to claim 1, wherein a pressure detector that detects pressure within the space part in the flange is provided.

4. The feed-through according to claim 1, wherein a gas sensor that detects gas within the space part in the flange is provided.

* * * * *